Patented Dec. 26, 1933

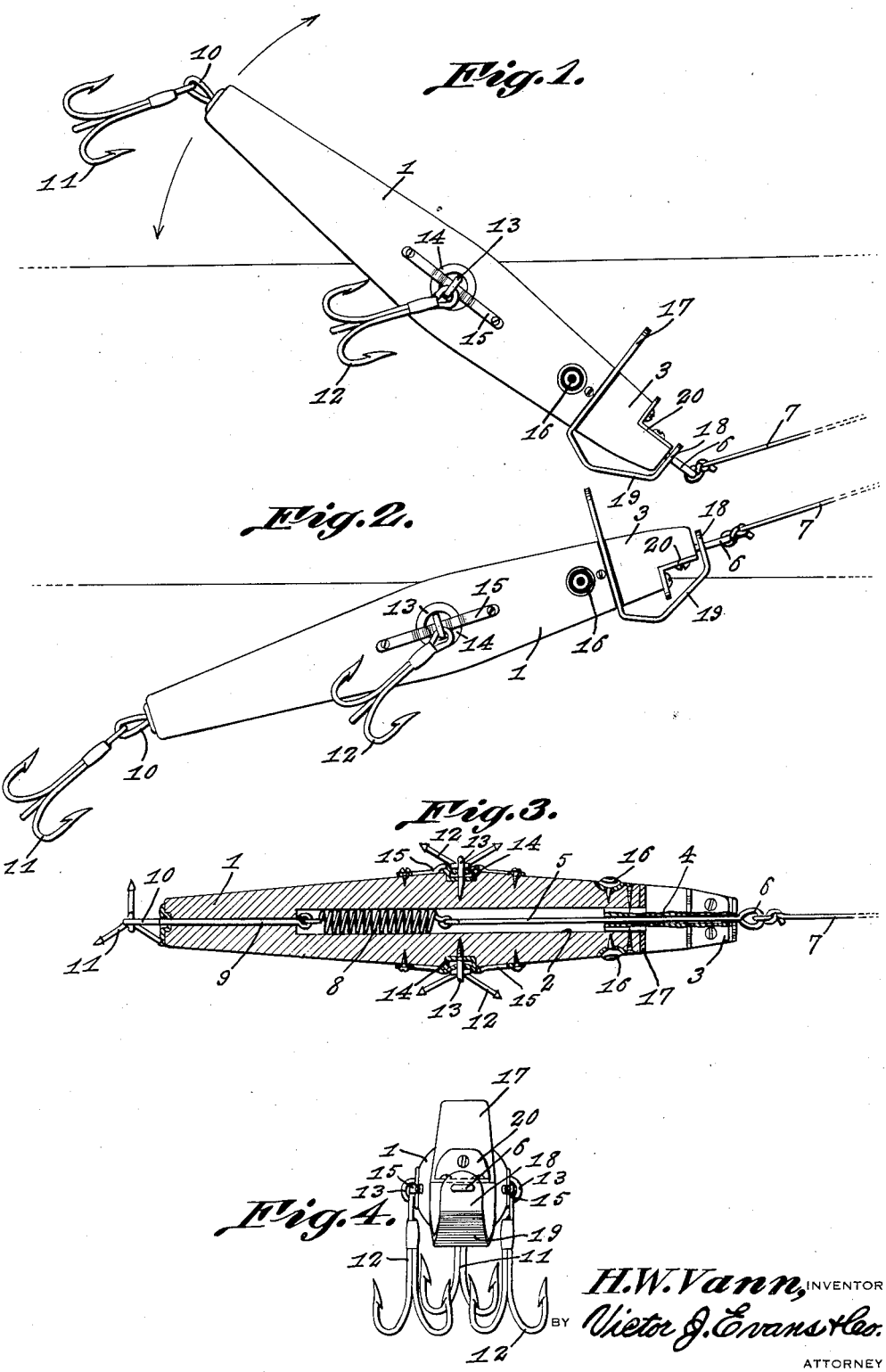

1,941,370

UNITED STATES PATENT OFFICE 1,941,370

FISH LURE

Hugh W. Vann, Thomasville, Ga.

Application May 24, 1932. Serial No. 613,297

2 Claims. (Cl. 43—46)

This invention relates to fish lures and its general object is to provide an artificial minnow which is not only capable of simulating a live minnow and its actions, but has a greater attraction for fish than a live minnow due to the fact that it is capable of rapid reciprocation in the form of wiggling, as it is being pulled through the water.

A further object of the invention is to provide an artificial minnow with adjusting means to vary its actions.

Another object of the invention is to provide an artificial minnow that can be easily and expeditiously removed from stationary obstructions, in the event it becomes hooked thereon.

A still further object of the invention is to provide an artificial minnow that is simple in construction, inexpensive to manufacture and extremely efficient for the purpose intended.

This invention also consists in certain other features of construction and in the combination and arrangement of the several parts, to be hereinafter fully described, illustrated in the accompanying drawing and specifically pointed out in the appended claims.

In describing my invention in detail, reference will be had to the accompanying drawing, wherein like characters denote like or corresponding parts throughout the several views, and in which:

Figure 1 is a side elevation of the artificial minnow which forms the subject matter of the present invention with the adjusting means arranged for disposing the minnow in the position shown.

Figure 2 is a similar view with the adjusting means arranged in another position and illustrates the position assumed by the minnow when the adjusting means is so arranged.

Figure 3 is a longitudinal sectional view taken through the minnow.

Figure 4 is a front view thereof.

Referring to the drawing in detail, the reference numeral 1 indicates the body of my artificial minnow and it will be noted that the body tapers in opposite directions from the center thereof to simulate the general shape of a live minnow. Disposed longitudinally and centrally through the body 1 is a bore 2 for a purpose which will be presently described, and secured to the forward end of the body is a head 3 which is provided with a bore 4 registering with the bore 2 and mounted for reciprocation in the bore 4 and extending into the bore 2 is a rod 5, the latter being provided with an eye 6 formed with its outer end, to which is adapted to be secured the fishing line, a portion of which is indicated by the reference numeral 7. Arranged within the bore 2 is a coil spring 8 that has one of its ends secured to the inner end of the rod 5 while the opposite end of the coil spring 8 is fixed to a stationary rod 9 which extends through the rear end of the body 1 and terminates in an eye 10 to have secured thereto the shank of barbed hooks 11.

By providing the spring connection between the line 7 and the body of the minnow, it will be apparent that the line will give and thereby prevent breakage thereof, but the most important feature of the spring connection is the fact that the minnow can be easily and readily removed from stationary obstructions in the event it becomes hooked thereon, and this action is brought about by giving the line a sudden jerk and releasing the same, which will result in rearward movement of the minnow and therefore remove the hooks from the obstruction.

I also provide hooks 12 that are fixed to the sides of the body which has arranged therein screw eyelets 13 that pass through cup-shape members 14 countersunk within the sides as best shown in Figure 3 and bridging the cup-shape members and extending therein as well as through the eyelets 13, are strips 15 which are secured upon opposite sides of the cup-shape members through the instrumentality of screws. It will be seen that the strips 15 cooperate with the screw eyelets in holding the cup-shaped members 14 in position, and also prevents the eyelets from being casually withdrawn.

Disposed adjacent the forward end of the body 1 and arranged upon opposite sides thereof are elements 16 to simulate eyes, and arranged between the head 3 and the forward portion of the body 1 is a relatively large flat arm 17 of a substantially L-shape member which includes a relative small arm 18 that is provided with an opening for the passage of the rod 5 therethrough. The substantially L-shape member is mounted for adjustment in a rotary manner and includes diverging inclined walls, the forward one of which is indicated by the reference numeral 19 which acts as a shielding means to be disposed in front of a recess formed in the head 3, when the L-shape member is in one position as shown in Figure 2. The recess has secured therein an angle plate 20 that has one of its arms extending beyond the inner wall of the recess as clearly shown in Figures 1 and 2.

From the above description and disclosure of the drawing, it will be obvious that I have provided an artificial minnow that is capable of being readily removed from obstructions and the like, and includes adjusting means to vary the position thereof during its passage through the water, the adjusting means being the L-shape member that includes the shielding means 19 which when moved to a position as shown in Figure 1, will be arranged away from the front of the recess, having the angle plate 20 arranged therein, to allow for a greater water resisting surface which cooperates with the arm 17 to cause the minnow to assume the diving position as shown in Figure 1, and of course, the action of the water against the arm 17 and plate 20 will cause the minnow to wiggle or reciprocate rapidly in a vertical plane due to the fact that the arm 17 and plate 20 will impede the forward motion thereof. When the L-shape member is adjusted to the position shown in Figure 2, the recess having the angle plate 20 arranged therein has the shielding means 19 disposed across the front thereof, and due to the action of the water thereagainst, the minnow will assume an upwardly inclined position, but will likewise move vertically in a rapid reciprocatory manner, therefore my minnow will naturally attract fish and the positions thereof can be changed in accordance with the desires of the user.

The head and body may be formed from any well known material and colored and decorated to simulate any kind of fish, but it is preferred that the body and head be brightly colored and decorated as it will then have a greater tendency to attract fish. The upper portion of the body may be of one color and design while the lower portion may be of a different color and design, so that the appearance of the minnow in the water can be changed as will be apparent.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:

1. An artificial minnow comprising a body, hooks connected with said body, a head for said body, resilient line connecting means secured in said body and extending through the head, said head having a recess therein and providing water resisting means, adjustable means including a relatively large arm secured between the head and body and extending above the same, and said adjustable means including shielding means for the recess for disposal in front of or away from the front of the latter to vary the angular positions assumed by the minnow when being drawn through the water.

2. An artificial minnow comprising a decorated body and head, the latter being provided with a recess arranged to form a water resisting means, means cooperating with the recess to change the positions assumed by the minnow while being drawn through the water and including a substantially L-shaped member provided with a relatively large flat arm extending above the minnow and an inclined wall, said substantially L-shaped member being adjustable to dispose the inclined wall in front of or away from the front of the recess, and an angle plate secured in said recess.

HUGH W. VANN.